(No Model.) 2 Sheets—Sheet 1.
C. F. ELMES.
MEANS FOR SHARPENING HORSESHOE CALKS.
No. 283,385. Patented Aug. 21, 1883.

Witnesses: L. L. Bond, M. C. Price

Inventor: Charles F. Elmes

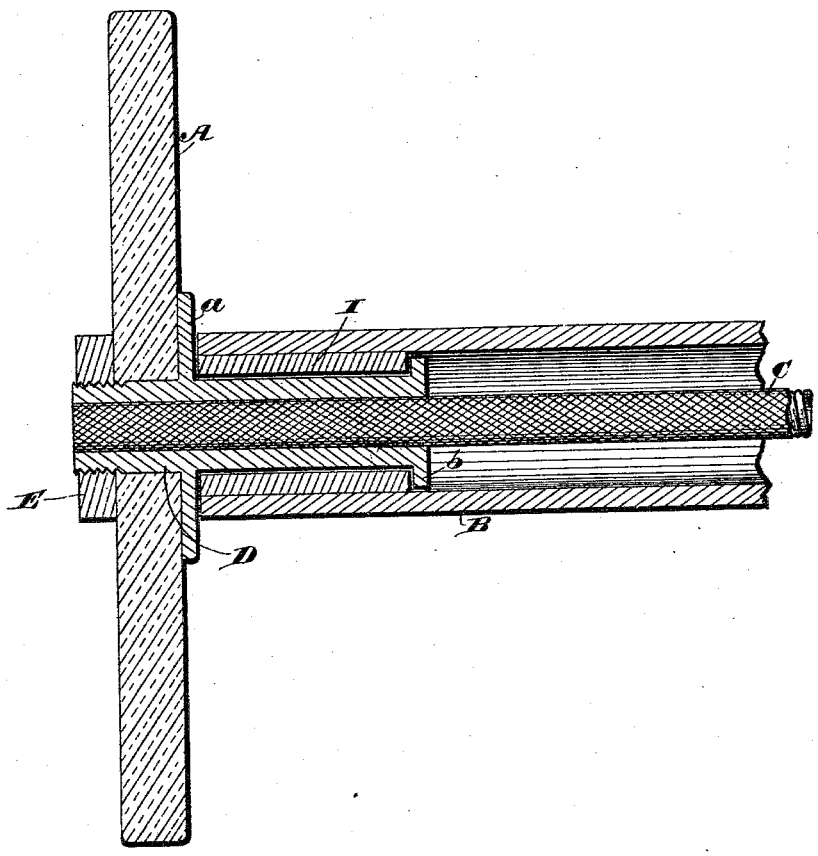

UNITED STATES PATENT OFFICE.

CHARLES F. ELMES, OF CHICAGO, ILLINOIS.

MEANS FOR SHARPENING HORSESHOE-CALKS.

SPECIFICATION forming part of Letters Patent No. 283,385, dated August 21, 1883.

Application filed February 23, 1883. (No model.)

*To all whom it may concern:*

Be it known that I, CHARLES F. ELMES, residing at Chicago, in the county of Cook and State of Illinois, and a citizen of the United States, have invented new and useful Improvements in Means for Sharpening Horseshoe-Calks, of which the following is a full description, reference being had to the accompanying drawings, in which—

Figure 1:
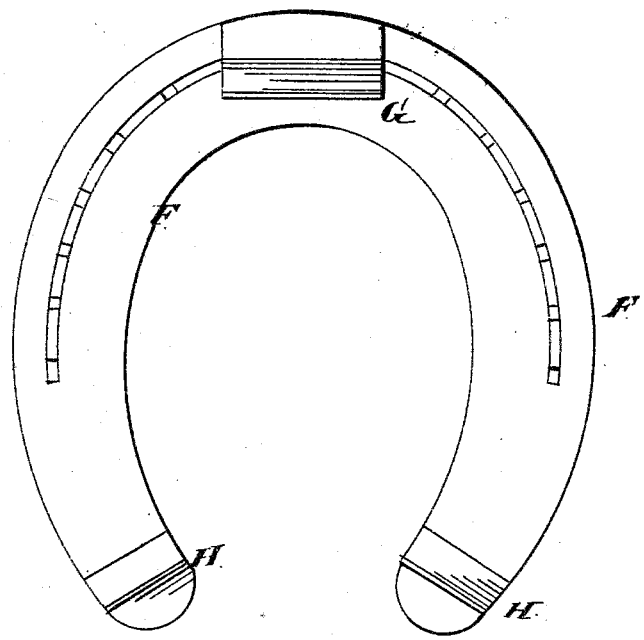
Figure 2:
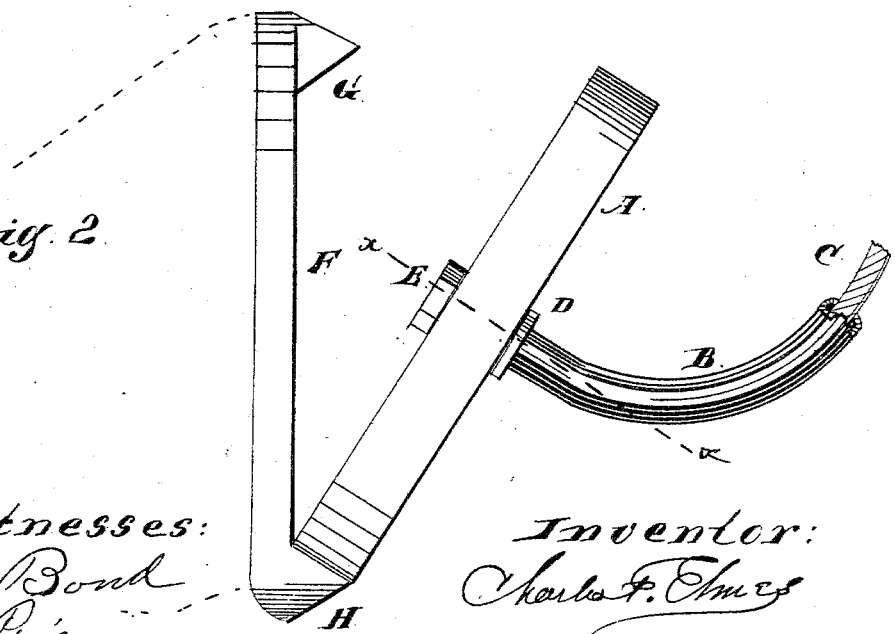

Figure 1 is an under view of a horseshoe; Fig. 2, an edge or side view of the shoe and side view of the means for sharpening the calks of the same, and Fig. 3 an enlarged sectional view on the line $x\,x$ of Fig. 2.

My invention has for its object the frequent or necessary sharpening of horseshoe-calks without removing the shoes, so that shoes can be kept sharp at all times without injuring the hoofs of the animals. This object I accomplish in the manner and by the means hereinafter described and claimed.

In the drawings, A represents an emery-wheel; B, the casing or shell around the flexible shaft; C, the flexible shaft; D, E, and I, couplings for attaching the emery-wheel to the flexible shaft and its casing; F, an ordinary horseshoe provided with the toe-calk G and heel-calks H.

The flexible shaft C is ordinarily a wire rope or cord passed through a rubber or other flexible tube or hose, B. To the free end of this shaft an emery-wheel, A, of the usual construction, is fastened by suitable screw-clamps D E. The covering B of the flexible shaft is brought up and attached to the non-rotating thimble or sleeve I, which is located loosely, between the shoulders $a$ and $b$, on the shank of the part D, so as to form a handle by which the emery-wheel can be guided or held in position to properly sharpen a horseshoe in any position in which it may be placed after the foot is lifted.

It will be seen from Fig. 2 that one calk can be sharpened or ground on either side without having the emery-wheel interfere or come in contact with either of the others, and by this arrangement each calk can be ground on one or both sides, as may be desired.

The flexible shaft C is operated by any suitable power, and is run to any suitable place convenient for containing the horse or other animal the shoes of which are to be sharpened. As I have used it, the shaft C was run through the wall of a factory to an open shed, where the horse's feet can be lifted, the emery-wheel applied, and the shoes sharpened each day, when ice was prevailing, in a few minutes of time, without even detaching the horses from the vehicle. It may, however, be arranged in a blacksmith-shop, stable, factory, or any other place where there is sufficient power to run it and animals can be properly brought within the range of the wheel. For conveniently and rapidly sharpening calks a considerable length of flexible shafting will be found advisable. The emery-wheel being run at a high speed, the calks are quickly sharpened, even when made of steel, as they should be, and thus the horse is put in as good a condition as though freshly shod, without having the shoes removed from its feet.

I have shown and described an emery-wheel which I prefer; but I do not limit myself to this particular wheel, as other grinding-wheels may be used for this purpose.

What I claim as new, and desire to secure by Letters Patent, is as follows:

The combination of the grinding-wheel A, the couplings D and E, the non-rotating thimble or sleeve I, arranged loosely on a shank of the part D, the casing B, secured to the thimble or sleeve, and the flexible shaft C, passing through the casing and connected with the wheel, substantially as described.

CHARLES F. ELMES.

Witnesses:
L. L. BOND,
M. L. PRICE.